A. F. BATCHELDER.
RESILIENT WHEEL.
APPLICATION FILED DEC. 16, 1921.

1,423,299.

Patented July 18, 1922.

Inventor:
Asa F. Batchelder,
by
His Attorney.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

RESILIENT WHEEL.

1,423,299.　　　　Specification of Letters Patent.　　Patented July 18, 1922.

Application filed December 16, 1921. Serial No. 522,895.

*To all whom it may concern:*

Be it known that I, ASA F. BATCHELDER, a citizen of the United States, residing at Schenectady, in the county of Schenectady, State of New York, have invented certain new and useful Improvements in Resilient Wheels, of which the following is a specification.

My invention relates to wheels of the type in which relatively rotatable rims and hubs are connected by cushioning devices to absorb shocks to which the rim or hub may be subjected and, where two such wheels are mounted on the same shaft, to take up any misalignment of the gear teeth on said wheels.

It has for its object to provide a novel resilient wheel which is simple to manufacture, is durable and is easily assembled with the parts under initial tension.

Figure 1:
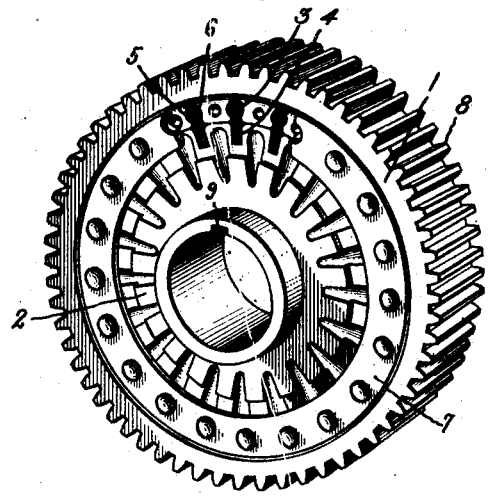
Figure 2:
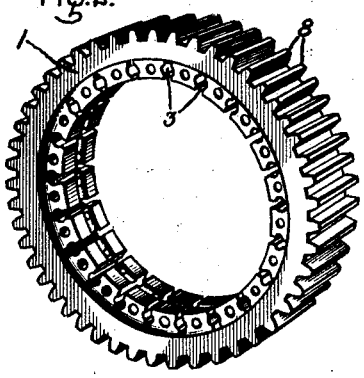
Figure 3:
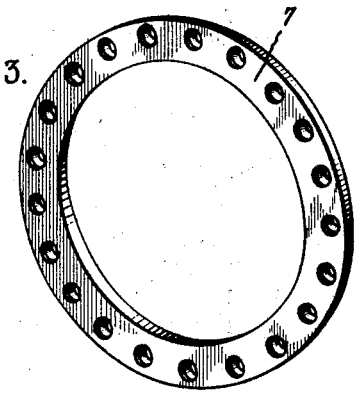
Figure 4:
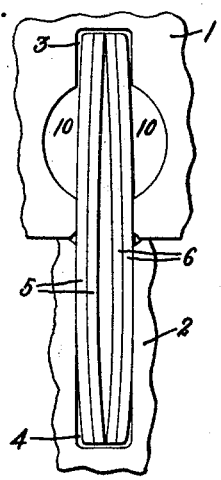

For a better understanding of my invention, reference may be had to the following description taken in connection with the accompanying drawing, in which Fig. 1 is a perspective view of a resilient wheel embodying my invention; Fig. 2 is a perspective view of the rim of the wheel of Fig. 1; Fig. 3 is a perspective view of a part of my wheel; and Fig. 4 is an enlarged view of a portion of my wheel.

In the drawing, the resilient wheel is shown as a gear wheel which comprises two parts 1 and 2. The outer part or rim 1 is shown in the form of a ring having substantially radial slots 3 in its inner periphery. The inner part or hub 2 cooperates with the rim 1 and has substantially radial slots 4 in its outer periphery registering with the slots 3 in the rim. The inside diameter of the rim 1 and the outside diameter of the hub 2 are substantially equal. Leaf springs 5 and 6 are placed in the slots 3 and 4 under tension. After the springs are put in place, end plates 7 are fastened to the rim 1 to keep the springs from being laterally displaced. I have shown the rim 1 as being provided with teeth 8 on its outer periphery and the hub 2 as being provided with a key way 9 for fastening the hub to a shaft or axis.

The springs 5 and 6 are bowed in the slots in order to put them under tension. The springs 5 in each slot are bowed in one direction and the springs 6 in each slot are bowed in the opposite direction. With such an arrangement, it will be noted that no matter in which direction the wheel is working, one set of springs 5 or 6 will tend to resiliently resist the rotation of the rim 1 with respect to the hub 2. The springs are equally spaced about the wheel and their number and strength may be varied to suit the conditions for which the wheel is intended.

Since the rims 1 are hardened, and since it is not necessary that the slots 3 therein have straight sides except at the inner and outer ends of the slots, I have found it desirable to cut away the walls of the slots 3 at 10 in order to save machining the whole of the slots in the hardened rim. The holes 10 are cut in the rim 1 before the same is hardened.

The construction described and illustrated is superior to resilient wheels as heretofore constructed, because it allows but a slight movement between rim and hub, there are no spring seats to wear and get out of line, and furthermore the wheel may be assembled with the springs 5 and 6 under any tension desired without any difficulty. I have found it possible, when my resilient wheel is used on an electric locomotive, to make the springs so stiff that no relative movement between the rim and hub takes place until the tractive effort equals 25 per cent of the weight of the locomotive on the rails.

I desire it to be understood that my invention is not limited to gear wheels, as it may be used without change with other driving mechanisms such as pulleys, armatures of dynamo electric machines, and the like.

What I claim as new and desire to secure by Letters Patent of the United States, is:—

1. A resilient wheel comprising an outer member in the form of a ring and having substantially radial slots in its inner periphery, an inner member cooperating with said outer member and having substantially radial slots in its outer periphery registering with said slots in the outer member, the inside diameter of the outer member and the outside diameter of the inner member being approximately equal, and leaf springs in said slots, said springs being placed in said slots under tension.

2. A resilient wheel comprising an outer member in the form of a ring and having substantially radial slots in its inner periphery, an inner member cooperating with said outer member and having substantially radial slots in its outer periphery registering with said slots in the outer member, the inside diameter of the outer member and the outside diameter of the inner member being approximately equal, and leaf springs in said slots, said springs being bowed in said slots so as to be under tension.

3. A resilient wheel comprising an outer member in the form of a ring and having substantially radial slots in its inner periphery, an inner member cooperating with said outer member and having substantially radial slots in its outer periphery registering with said slots in the outer member, the inside diameter of the outer member and the outside diameter of the inner member being approximately equal, and leaf springs in said slots, a portion of said springs in each slot being bowed in one direction and the remainder of said springs in each slot being bowed in the opposite direction, whereby said springs are under tension.

4. A resilient wheel comprising an outer member in the form of a ring and having substantially radial slots in its inner periphery, an inner member cooperating with said outer member and having substantially radial slots in its outer periphery registering with said slots in the outer member, the inside diameter of the outer member and the outside diameter of the inner member being approximately equal, leaf springs in said slots, a portion of said springs in each slot being bowed in one direction and the remainder of said springs in each slot being bowed in the opposite direction, whereby said springs are under tension, and end plates fastened to said outer member for preventing said springs from being laterally displaced.

In witness whereof, I have hereunto set my hand this 14th day of December, 1921.

ASA F. BATCHELDER.